Patented Jan. 25, 1938

2,106,228

UNITED STATES PATENT OFFICE 2,106,228

COLORING AND PROTECTIVE COATINGS

Oskar Schober, Horrem, Bezirk Koeln, Germany, assignor to American Lurgi Corporation, New York, N. Y., a corporation of New York No Drawing. Application September 6, 1933, Serial No. 688,353. In Germany September 1, 1930

3 Claims. (Cl. 134—76)

The present invention relates to an improved pigment and a liquid coating composition containing the same, and to a method of producing coloring and protective coatings.

Heretofore, it has been well known that certain paints and liquid coating compositions have been employed for covering surfaces, particularly metallic surfaces containing iron, and/or steel for preservative, coloring and protective purposes. In order to fulfill its function, the paint had to withstand being exposed to sun, rain, wind, stresses due to temperature and mechanical changes, and the corrosive action of fumes, vapors, gases and especially the salt water of the ocean or rivers. In connection with corrosion of metallic surfaces, particularly of iron and steel, it has been observed that certain pigments are inhibitors or rust-preventing agents, certain other pigments are stimulators or rust-producing agents, and certain other pigments are indeterminates or inert agents. For the proper protection of metallic surfaces, particularly those of iron and steel, it is of extreme importance that the priming coat should contain strong inhibitor pigments. The investigators in the art have been searching for pigments which are better inhibitors than those of the prior art and which are capable of replacing such conventional pigments as red lead, and the like. Although many attempts have been made, none, as far as I am aware, has been wholly satisfactory and successful in providing the art with a pigment acceptable to the trade.

I have discovered an improved pigment which overcomes the disadvantages and shortcomings of prior pigments and which is capable of functioning as an inhibitor and of imparting passivity to metallic surfaces, particularly those of iron and steel.

It is an object of the present invention to provide an improved pigment which is capable of replacing conventional pigments such as red lead, zinc oxide, and the like, and which is capable of protecting and preserving surfaces, particularly metallic surfaces when embodied in a paint or liquid coating composition.

It is another object of the invention to provide a pigment which is substantially free from heavy metals and other impurities and which is non-poisonous and harmless.

It is a further object of the invention to provide a pigment which has a low specific gravity and a great hiding power.

It is also within the contemplation of the invention to provide a pigment which is capable of being reduced to an extremely fine state of subdivision and which, even under industrial conditions of manufacture and production, is composed of particles having a size finer than 10,000 mesh per square centimeter.

Other objects and advantages of the invention will become apparent from the following description of the invention:

It has been established that intimate mixtures of silicon and aluminium are admirably adapted as pigments for the production of coloring and protective coatings on substances of the most diverse character, particularly metallic surfaces such as iron and steel. These coatings containing aluminum-silicon pigments are distinguished by extreme resistance to temperatures up to red heat and to chemical action. For instance, the improved pigments are resistant to corrosion by atmospheric influences, by industrial effluents and gases and by sea air and water. Paints containing aluminum-silicon pigments also possess excellent covering and filling properties in addition to powerful adhesive properties, thereby affording safe protection to the surfaces, particularly metallic surfaces, including iron and steel. Furthermore, extremely economical consumption of paints containing aluminum-silicon pigments may be enjoyed. Finally, the pigments have an agreeable, warm tone which is capable of wide variation by varying the relative proportions of the components.

When the aluminum-silicon pigments are employed in combination with binding media or mixtures of binding media, such as are customarily employed in the paint industry, the pigments afford the advantage that they produce a particularly dense and homogeneous pigmentation of the entire paint film. This feature is especially desirable from the point of view of protection against rust due to the fact that the dense and homogeneous pigmentation not only substantially reduces the tendency of the paint film to swell but also greatly increases the adsorptive capacity towards the binding medium. These factors have a very important relation to the character of the structure of the paint film and to the stability thereof and its resistance to the action of numerous agencies.

With regard to the binding medium employed, the choice is generally governed in any individual case by the requirements to be met by the desired coating. For example, such requirements as the resistance to heat or to the chemical influence of gases or liquids, the drying period and so forth. Thus, coatings containing linseed oil have proved satisfactory for withstanding, for example, normal conditions, but it is generally advisable where more severe conditions are to be encountered to add to such binding media a small quantity of copal or the like. By adding copal it is possible to obtain an increased resistance to chemical influences.

The pigments have also proved particularly valuable for coating or impregnating wood and other organic substances. In addition, metals, such as iron and steel, can be coated. A preservative action is imparted to wood and the like to resist decay, bacteria, moisture, and harmful gases and liquids. The inflammability of the wood or the like is also reduced, if the coating mass be made of suitable composition. This is of especial importance for numerous modes of application, particularly in ship building.

As compared with the known coatings produced by applying powdered aluminium (so-called aluminium bronze) paints, the coatings produced by paints containing mixtures of silicon and aluminium in accordance with the present invention, offer substantial advantages, such as quiet shades which vary between light and dark gray with a brownish tinge, obtainable by modifying the relative proportions of the components as desired. The present coatings are in contradistinction to the glaring silvery metallic sheen of coatings furnished by aluminium which is disadvantageous for many purposes. The improved coatings also offer the advantage that their radiation of heat increases with the proportion of silicon present. This unique and valuable property substantially favors the use of the present pigments as coatings for radiators or other heat-transferring apparatus. This is a remarkable advantage over ordinary colored coatings of aluminium, which are known to be poor radiators of heat. Then again, the new coatings are substantially superior to the known aluminium coatings in regard to their powers of resisting the corrosive action of chemicals and in regard to the high degree of pigmentation achieved when employed with binding media.

Particular advantage has been found to result from the employment of aluminium-silicon mixtures containing not less than 5% of silicon. In addition to aluminium and silicon mixtures to be employed in accordance with the invention, the pigment may contain suitable admixtures of metallic or non-metallic substances. For instance, such substances which are adapted to influence the coloring, the weather-proof character or the heat-radiating character may be added. When aluminium-silicon mixtures are employed, such additions may be present, from the outset, as components of the mixtures themselves or be incorporated therewith only prior to use, for example during mixing or incorporation with the binding media.

The hereindescribed coloring and protective coatings can be applied in a great variety of ways. For example, a mixture of the powdered components with a binding medium can be applied to the surface that is to be coated, by brushing, spraying or by the dipping process or in any other way.

The coating may be applied in any convenient manner. For instance, the components may be applied in a molten state. Thus, the mixture may be used in the form of a powder or of a fine grit in a so-called metal spraying gun or any other apparatus suitable for spraying metals in well known manner. In this case, coatings of excellent adhesive properties and resistance can be obtained, which have the same tone (between light and dark grey, with a brownish tinge) as those coatings applied with binding media but are distinguished from these latter coatings by a velvety appearance.

For the purpose of giving those skilled in the art a better understanding of the invention, the following illustrative example will be given. It is to be understood, however, that the invention is not to be limited to the specific example but is to be construed according to the spirit and scope of the appended claims.

*Example I*

250 grams of an intimate mixture of about 186 grams of very finely ground metallic aluminum with about 64 grams of very finely ground metallic silicon are mixed with 750 grams of a mixture of a suitable binding medium (such as, for example, boiled linseed oil) with a small quantity of a diluent (such as, for example, turpentine oil) advantageously in connection with a drier. This mass is brought into distributable condition in a suitable manner, for example with the aid of a mixing apparatus and a colloid mill. The ready mixed paint has good keeping properties and merely needs stirring up before use. It may be easily applied with a brush, or a paint-spraying gun and produces a grey coating.

According to the purpose in view, boiled linseed oil may be replaced by lacquer varnish and the like. In all cases, the most suitable proportion of pigment to varnish depends, on the one hand, on the composition of the pigment and, on the other, the kind of product to be made (i. e. whether a brush or spray paint, a linseed oil or lacquer paint, Zapon lacquers, etc.). The suitable proportion can easily be ascertained in each case by a preliminary experiment. The usual commercial driers and diluents can also be employed, in a suitable manner, with these paints.

It is to be observed that the present invention provides a pigment which is composed of aluminum and silicon in a very finely ground condition and in a very intimate mixture whereby a joint or dual effect is produced by the combined aluminum and silicon.

It is also to be noted that the present invention provides a pigment comprising an intimate mixture of finely ground metallic aluminum and silicon in which the proportions of aluminum and silicon vary depending upon the particular conditions, but the silcon must never be present in an amount less than 5% by weight. Of course, the proportions given in the specific example of aluminum to silicon are not the only ones but the silicon may be present to a greater extent. Thus, for instance, silicon may be present to an extent of about 40% to about 50% by weight or higher, if desired.

Furthermore, it is to be observed that the present invention, an improved liquid coating composition, is useful not only for the covering and coloring of wood and organic materials but also inorganic materials and metallic surfaces. It has been found especially useful in coating the surfaces of light metals and alloys.

The present application is a continuation in part of applicant's application Serial No. 638,387, filed Oct. 18, 1932, which issued as Patent No. 1,953,508.

I claim:

1. A coloring and protective coating composition comprising a vehicle and a pigment suspended therein composed of an intimate mixture of finely ground metallic aluminum and silicon distributed throughout said vehicle in finely divided form, said mixture containing at least 5% of silicon.

2. A coloring and protective coating composition comprising a liquid binding medium and a pigment suspended therein composed of an intimate mixture of finely ground metallic aluminum and silicon containing about 20% to about 60% of silicon, said pigment being distributed throughout said binding medium in finely-divided form.

3. A liquid coloring and protective composition comprising a liquid binding medium, a diluent and a pigment suspended therein composed of an intimate mixture of finely ground metallic aluminum and silicon containing more than about 20% of silicon, said pigment being distributed throughout said binding medium in finely-divided form.

OSKAR SCHOBER.